United States Patent
Abe et al.

(10) Patent No.: US 10,000,021 B2
(45) Date of Patent: Jun. 19, 2018

(54) METHOD FOR MANUFACTURING THREE-DIMENSIONAL SHAPED OBJECT AND THREE-DIMENSIONAL SHAPED OBJECT OBTAINED BY THE SAME

(75) Inventors: Satoshi Abe, Osaka (JP); Yoshikazu Higashi, Shiga (JP); Isao Fuwa, Osaka (JP); Masataka Takenami, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 1214 days.

(21) Appl. No.: 13/378,475

(22) PCT Filed: Jun. 23, 2010

(86) PCT No.: PCT/JP2010/060619
§ 371 (c)(1),
(2), (4) Date: Dec. 15, 2011

(87) PCT Pub. No.: WO2010/150805
PCT Pub. Date: Dec. 29, 2010

(65) Prior Publication Data
US 2012/0093674 A1  Apr. 19, 2012

(30) Foreign Application Priority Data
Jun. 23, 2009 (JP) ................. 2009-148866

(51) Int. Cl.
*B22F 3/105* (2006.01)
*B22F 5/00* (2006.01)
(Continued)

(52) U.S. Cl.
CPC ........ *B29C 67/0077* (2013.01); *B22F 3/1055* (2013.01); *B22F 5/007* (2013.01);
(Continued)

(58) Field of Classification Search
CPC ....... B29C 67/0077; B29C 33/38; B29C 9/00; B23P 15/00; B22F 3/1055; B22F 5/007;
(Continued)

(56) References Cited

U.S. PATENT DOCUMENTS 4,235,277 A * 11/1980 Aizawa et al. ................. 164/36
5,932,059 A    8/1999 Langer et al.
(Continued)

FOREIGN PATENT DOCUMENTS

DE    19533960    3/1997
JP    1-502890    10/1989
(Continued)

OTHER PUBLICATIONS

Office Action issued in Germany Counterpart Patent Appl. No. 112010002686.6, dated Jul. 9, 2015, along with an English translation thereof.
(Continued)

*Primary Examiner* — Keith Walker
*Assistant Examiner* — John A Hevey
(74) *Attorney, Agent, or Firm* — Greenblum & Bernstein, P.L.C.

(57) ABSTRACT

There is provided a method for manufacturing a three-dimensional shaped object. The method of the present invention comprises the repeated steps of: (i) forming a solidified layer by irradiating a predetermined portion of a powder layer with a light beam, thereby allowing a sintering of the powder in the predetermined portion or a melting and subsequent solidification thereof; and (ii) forming another solidified layer by newly forming a powder layer on the resulting solidified layer, followed by the irradiation of a predetermined portion of the powder layer with the light beam; wherein only the surface portion of the solidified
(Continued)

layer, to which a force is applied when the three-dimensional shaped object is used, is subjected to a machining process.

4 Claims, 15 Drawing Sheets

(51) Int. Cl.
- *B22F 3/24* (2006.01)
- *B29C 67/00* (2017.01)
- *B33Y 10/00* (2015.01)
- *B33Y 80/00* (2015.01)
- *B23P 15/00* (2006.01)

(52) U.S. Cl.
CPC ............... *B23P 15/00* (2013.01); *B33Y 10/00* (2014.12); *B33Y 80/00* (2014.12); *B22F 2003/247* (2013.01); *B22F 2998/10* (2013.01); *Y02P 10/292* (2015.11); *Y02P 10/295* (2015.11)

(58) Field of Classification Search
CPC B22F 2998/10; B22F 2003/247; B22F 3/105; B22F 7/00; Y02P 10/292; Y02P 10/295; B33Y 10/00; B33Y 80/00; H05B 6/00
USPC .............................................. 419/7; 425/175
See application file for complete search history.

(56) References Cited

U.S. PATENT DOCUMENTS

| | | | | |
|---|---|---|---|---|
| 6,224,816 | B1* | 5/2001 | Hull | B22F 5/007 264/219 |
| 7,125,512 | B2* | 10/2006 | Crump | B29C 33/3842 264/328.1 |
| 7,172,724 | B2* | 2/2007 | Abe | B22F 3/1055 264/497 |
| 7,255,821 | B2* | 8/2007 | Priedeman, Jr. | B29C 67/0055 264/219 |
| 8,738,166 | B2* | 5/2014 | Abe | B22F 3/1055 249/78 |
| 2004/0182201 | A1* | 9/2004 | Fuwa et al. | 75/252 |
| 2004/0228754 | A1* | 11/2004 | Abe et al. | 419/6 |
| 2006/0208396 | A1* | 9/2006 | Abe et al. | 264/497 |
| 2007/0029698 | A1* | 2/2007 | Rynerson | B22F 3/1055 264/219 |
| 2007/0038531 | A1* | 2/2007 | Lukis et al. | 705/26 |
| 2010/0044547 | A1 | 2/2010 | Higashi et al. | |
| 2010/0044922 | A1 | 2/2010 | Higashi et al. | |
| 2011/0109016 | A1 | 5/2011 | Fuwa et al. | |
| 2011/0123383 | A1* | 5/2011 | Fuwa | B22F 3/1055 419/11 |

FOREIGN PATENT DOCUMENTS

| | | |
|---|---|---|
| JP | 8-504139 | 5/1996 |
| JP | 2000-073108 | 3/2000 |
| JP | 2003-293012 | 10/2003 |
| JP | 2004-175093 | 6/2004 |
| JP | 2008-291315 | 12/2008 |
| JP | 2009-108348 | 5/2009 |
| JP | 2009-279928 | 12/2009 |
| JP | 2010-046694 | 3/2010 |
| JP | 2010-047813 | 3/2010 |
| JP | 2010-100883 | 5/2010 |
| JP | 2010-100884 | 5/2010 |
| WO | 88/02677 | 4/1988 |
| WO | 2008/026500 | 3/2008 |
| WO | WO 2008/026500 A1 * | 3/2008 |

OTHER PUBLICATIONS

Office Action issued in India Counterpart Patent Appl. No. 9750/CHENP/2011, dated Nov. 13, 2017.
Written Opinion of the International Searching Authority, dated Jan. 26, 2012 along with an english translation thereof.
China Office action, dated May 30, 2013 along with partial english language translation thereof.

\* cited by examiner (a)

(b)

(a)

High-density portion (Melting)

Solidified density: 99.8%

(b)

Low-density portion

Solidified density: 75.1%

Porous hole

METHOD FOR MANUFACTURING THREE-DIMENSIONAL SHAPED OBJECT AND THREE-DIMENSIONAL SHAPED OBJECT OBTAINED BY THE SAME

TECHNICAL FIELD

The present invention relates to a method for manufacturing a three-dimensional shaped object, and also relates to the three-dimensional shaped object. More particularly, the present invention relates to a method for manufacturing a three-dimensional shaped object with a plurality of solidified layers stacked integrally by repeating the step of forming a solidified layer by irradiating a predetermined portion of a powder layer with a light beam, and also relates to the three-dimensional shaped object obtained by such manufacturing method.

BACKGROUND OF THE INVENTION

Heretofore, a method for manufacturing a three-dimensional shaped object by irradiating a powder with a light beam has been known (such method can be generally referred to as "selective laser sintering method"). Such method can produce a three-dimensional shaped object with a plurality of solidified layers stacked integrally by repeating the step (i) of forming a solidified layer by irradiating a predetermined portion of a powder layer with a light beam, thereby allowing sintering of the predetermined portion of the powder or melting and subsequent solidification thereof, and the step (ii) of forming another solidified layer by newly forming a powder layer on the resulting solidified layer, followed by similarly irradiating the powder layer with the light beam (see JP-T-01-502890 or JP-A-2000-73108). The three-dimensional shaped object thus obtained can be used as a metal mold in a case where inorganic powder materials such as a metal powder and a ceramic powder are used as the powder material. While on the other hand, the three-dimensional shaped object can be used as a model or replica in a case where organic powder materials such as a resin powder and a plastic powder are used as the powder material. This kind of technology makes it possible to produce the three-dimensional shaped object with a complicated contour shape in a short period of time.

According to the selective laser sintering method, a three-dimensional shaped object is often manufactured in a chamber which is kept under an inert atmosphere from the viewpoint of the prevention of oxidation or the like. By way of the case of using a metal powder as a powder material and using the resulting three-dimensional shaped object as metal mold, as shown in FIG. 1, a powder layer 22 with a predetermined thickness t1 is firstly formed on a base plate for shaped object 21 (see FIG. 1(a)) and then a predetermined portion of a powder layer 22 is irradiated with a light beam to form a solidified layer 24 on base plate for shaped object 21. Then, a powder layer 22 is newly provided on the solidified layer 24 thus formed and is irradiated again with the light beam to form another solidified layer. In this way, when the solidified layer is repeatedly formed, it is possible to obtain a three-dimensional shaped object with a plurality of solidified layers 24 stacked integrally (see FIG. 1(b)). The solidified layer corresponding to a bottom layer can be formed in a state of being adhered to the surface of the base plate. Therefore, the three-dimensional shaped object and the base plate are mutually integrated. The integrated "three-dimensional shaped object" and "base plate" can be used as a metal mold as they are.

The three-dimensional shaped object obtained by the laser-beam irradiation has a relatively roughened surface. In general, the shaped object has the roughened surface Rz of several hundred micrometers. This is attributed to the fact that the surface of the solidified layer has the adhered powder. When the solidified layer is formed, the energy of the laser beam is changed into heat, which causes the irradiated powder to melt. The melted powder particles are fused with each other during the subsequent cooling step thereof. In this regard, the temperature can be raised in the surrounding powder region of the irradiated point, and thus such surrounding powder tends to adhere to the surface of the solidified layer. This adherence of the powder causes a roughened surface of the three-dimensional shaped object, and thereby a finish processing of surface is necessary therefor. Specifically, the whole surface of the obtained three-dimensional shaped object is required to be subjected to a machining process. For example, as for the obtained three-dimensional shaped object disclosed in JP-T-08-504139, an outer shell portion of the object is subjected to the machining process (see FIG. 16).

According to the actual state of such machining process, consideration is not made on a final use application of the three-dimensional shaped object, and the machining process of the whole exposed surface of the shaped object is performed. For example as for the invention of JP-T-08-504139, the machining process is performed for the whole of the outer shell portion which surrounds the body of the three-dimensional shaped object. This is by no means satisfactory from the viewpoint of the manufacturing cost and time. Moreover, considering that a machining process is generally performed to chip off the surface region for the purpose of obtaining desired form and surface roughness, and it is nothing short of a mechanical process (i.e., process using a machine tool), there is a concern that it causes a damage in the three-dimensional shaped object due to a machining stress (cutting stress) and a machining heat (cutting heat).

DISCLOSURE OF THE INVENTION

Under these circumstances, the present invention has been created. That is, an object of the present invention is to provide a "method for manufacturing a three-dimensional shaped object" which not only enables more reduced manufacturing time and manufacturing cost, but also prevents a quality loss of the resulting three-dimensional shaped object.

In order to achieve the above object, the present invention provides a method for manufacturing a three-dimensional shaped object, the method comprising the repeated steps of:

(i) forming a solidified layer by irradiating a predetermined portion of a powder layer on a forming table (preferably on a base plate for shape object) with a light beam, thereby allowing a sintering of the powder in the predetermined portion or a melting and subsequent solidification thereof; and (ii) forming another solidified layer by newly forming a powder layer on the resulting solidified layer, followed by the irradiation of a predetermined portion of the powder layer with the light beam;

wherein only the surface portion of the solidified layer, to which a force is applied when the three-dimensional shaped object is used, is subjected to a machining process.

For one thing, the manufacturing method of the present invention is characterized in that the machining process is performed only for the necessary portion of the three-dimensional shaped object in light of a final use application of the shaped object. More specifically, a surface machining process (surface milling process) is performed only for the portion of the solidified layer, to which a force is applied when the three-dimensional shaped object is used.

As used in this description and claims, the term "force" substantially means a force which is applied to a three-dimensional shaped object when being used in its use application. For example, the term "force" means a force applied to the shaped object, the force being attributable to a contact of the shaped object with a fluid or solid when the shaped object is used.

As used in this description and claims, the term "machining process" means a process for cutting away a part of an object by use of a tool. Therefore, as for the present invention, the term "machining process" means a process by which a surface portion of the three-dimensional shaped object is cut away to reduce a surface roughness thereof.

Describing just for confirmation, the term "powder layer" as used in this description and claims means, for example, "metal powder layer made of a metal powder" or "resin powder layer made of a resin powder". Also, the term "predetermined portion of a powder layer" substantially means a portion of a three-dimensional shaped object to be manufactured. Therefore, a powder existing in such predetermined portion is irradiated with a light beam, whereby, the powder undergoes a sintering or a melting and subsequent solidification thereof to form a shape of a three-dimensional shaped object. Furthermore, the term "solidified layer" substantially means "sintered layer" when the powder layer is a metal powder layer, whereas it substantially means "cured layer" when the powder layer is a resin powder layer.

In one preferred embodiment, the three-dimensional shaped object is used as a core metal mold or cavity metal mold, and only the surface portion corresponding to a cavity-forming surface of the metal mold when being used is subjected to the machining process. The phrase "cavity-forming surface" is a surface with which the resin material for molding comes into contact when the mold is used, and thus it corresponds to the surface portion of the solidified layer to which the force is applied.

In another preferred embodiment, the three-dimensional shaped object is used as a core metal mold or cavity metal mold, and only the surface portion corresponding to a part of a metal mold's surface (particularly, annular surface part located immediately outside the cavity-forming surface of the metal mold) where the core metal mold and the cavity metal mold when being used come into contact with each other is subjected to the machining process. The phrase "metal mold's surface where the core metal mold and the cavity metal mold when being used come into contact with each other" means a contacting surface where a peripheral portion of the core metal mold and a peripheral portion of the cavity metal mold come into contact with each other when they are mutually mold-clamped, and thus it corresponds to the surface portion of the solidified layer to which the force is applied. It is preferred in this embodiment that the solidified layer is formed such that "portion to be not subjected to the machining process" has a surface level lower than "portion to be subjected to the machining process".

In still another preferred embodiment, a portion of the solidified layer, which serves as a later-machining reference, is additionally subjected to the machining process. The term "later-machining reference" substantially means an indication used at the later time of another processing. Specifically, considering a case where the three-dimensional shaped object or a base plate for the shaped object integrated therewith is afterward machined according to an intended end-usage, an indicating part therefor can correspond to the later-machining reference.

It is preferred in the manufacturing method of the present invention that the solidified layer is formed such that the surface portion of the solidified layer, to which the force is applied when the three-dimensional shaped object is used, has a high-density with its solidified density of 95 to 100%. In this case, the high-density portion is formed preferably due to a complete melting of the powder irradiated with the light beam in the predetermined portion. The term "high-density portion" as used herein refers to so-called "melting" (i.e., a portion formed by solidification after a substantially complete melting of a powder constituting a powder layer). That is, the term "high-density portion" substantially means a portion, through which a fluid such as liquid or gas does not pass, because of its very high solidified density (i.e., solidified density of about 95 to 100%).

The present invention also provides a three-dimensional shaped object obtained by the aforementioned manufacturing method. In particularly preferred embodiment, such three-dimensional shaped object is a core metal mold or cavity metal mold, and it has a machined surface serving as a cavity-forming surface of the metal mold. Also, the above three-dimensional shaped object may have a machined surface serving as apart of a metal mold's surface where the core metal mold and the cavity metal mold when being used come into contact with each other.

Effect of the Invention

In accordance with the present invention, the surface machining process is performed only at required portion, and thereby making it possible to shorten the manufacturing time and also to reduce an energy for driving a machine tool.

According to the manufacturing method of the present invention, there is provided a reduced proportion of the machined surface in the entire three-dimensional shaped object, since the surface machining process is performed only at required portion. Therefore, in light of the fact that the machined portion is considered "portion where process damage is caused due to machining stress and machining heat", the present invention can produce the three-dimensional shaped object with a percentage of the damaged portion being kept as low as possible. This can prevent a reduction of a mechanical strength of the three-dimensional shaped object to a maximum extent. In other words, a desired quality (i.e., desired mechanical strength) of the three-dimensional shaped object can be finally maintained.

Furthermore, it was inevitably required in the prior art to design on preliminary assumption of the extent of the damage attributed to the machining process in order to achieve a prevention of the reduced mechanical strength of the three-dimensional shaped object. However, it is possible according to the present invention to prevent a reduction of the mechanical strength of the three-dimensional shaped object while reducing the manufacturing time and manufacturing cost only by subjecting the shaped object to the machining process in view of the use application of the shaped object. In other words, the present invention is also very useful in that it is possible to suitably design the shaped object while preventing an increase in the manufacturing time and manufacturing cost in spite of an unpredictable "damage attributed to the machining process".

Figure 1:
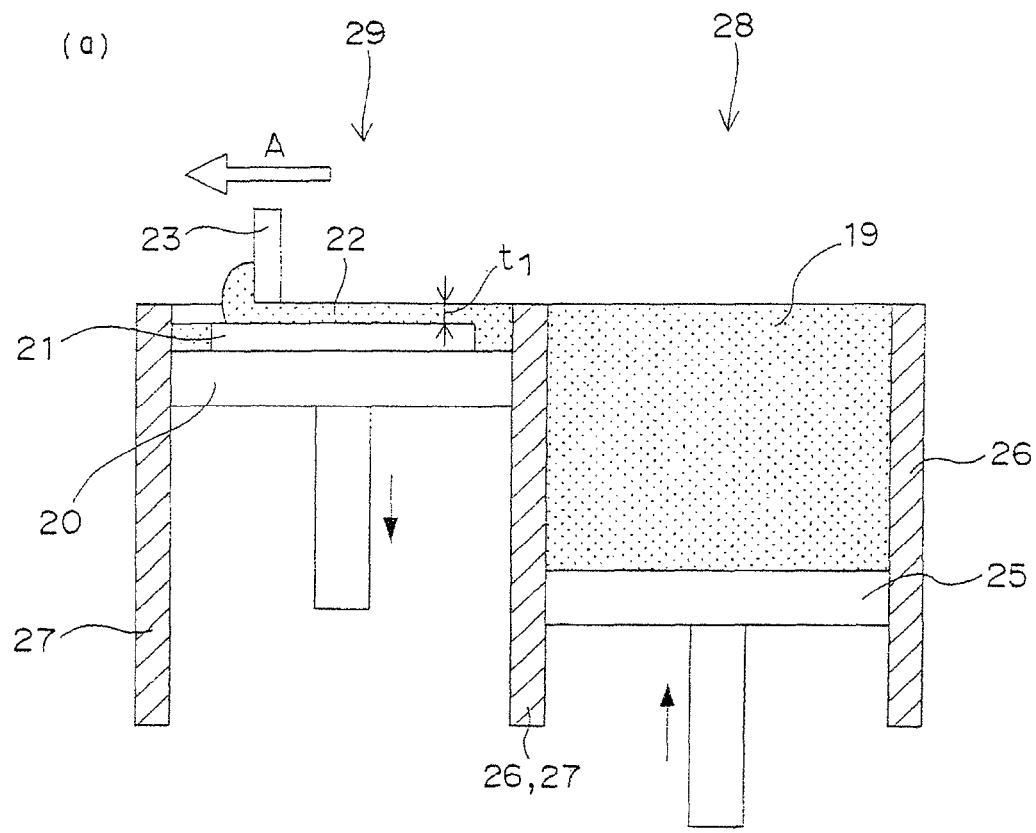
FIG. 1 is a sectional view schematically showing operations of a laser-sintering/machining hybrid machine.
Figure 1:
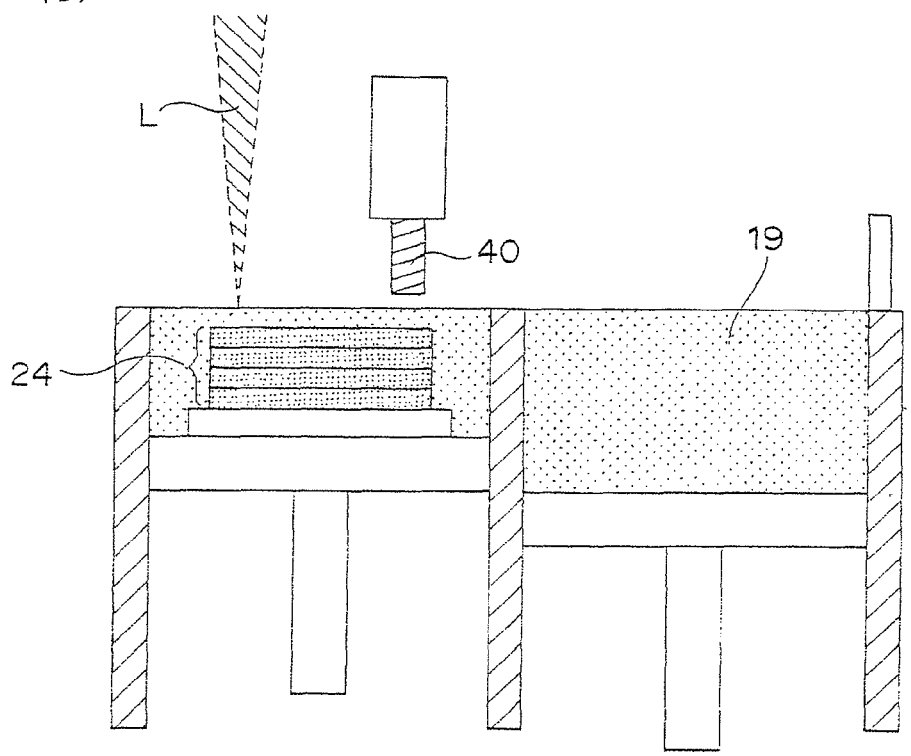

In the drawings, the reference numerals correspond to the following elements:
1 Laser-sintering/machining hybrid machine
2 Powder layer forming means
3 Laser-beam irradiation means
4 Machining means
19 Powder/powder layer (e.g., metal powder/metal powder layer or resin powder/resin powder layer)
20 Forming table
21 Base plate for shaped object
22 Powder layer (e.g., metal powder layer or resin powder layer)
23 Squeegee blade
24 Solidified layer (e.g., sintered layer or cured layer) or three-dimensional shaped object obtained therefrom
25 Powder table
26 Wall of storage tank for powder material
27 Wall of forming tank
28 Storage tank for powder material
28 Forming tank
30 Light beam generator
31 Galvanometer mirror
3 Reflecting mirror
33 Collecting lens
40 Milling head
41 X-Y actuator
41a X-axis actuator
41b Y-axis actuator
42 Tool magazine
50 Chamber
52 Window for transmission of light
60 later-machining reference
L Light beam
P "Force" applied to three-dimensional shaped object in use

BEST MODES FOR CARRYING OUT THE INVENTION

Figure 2:
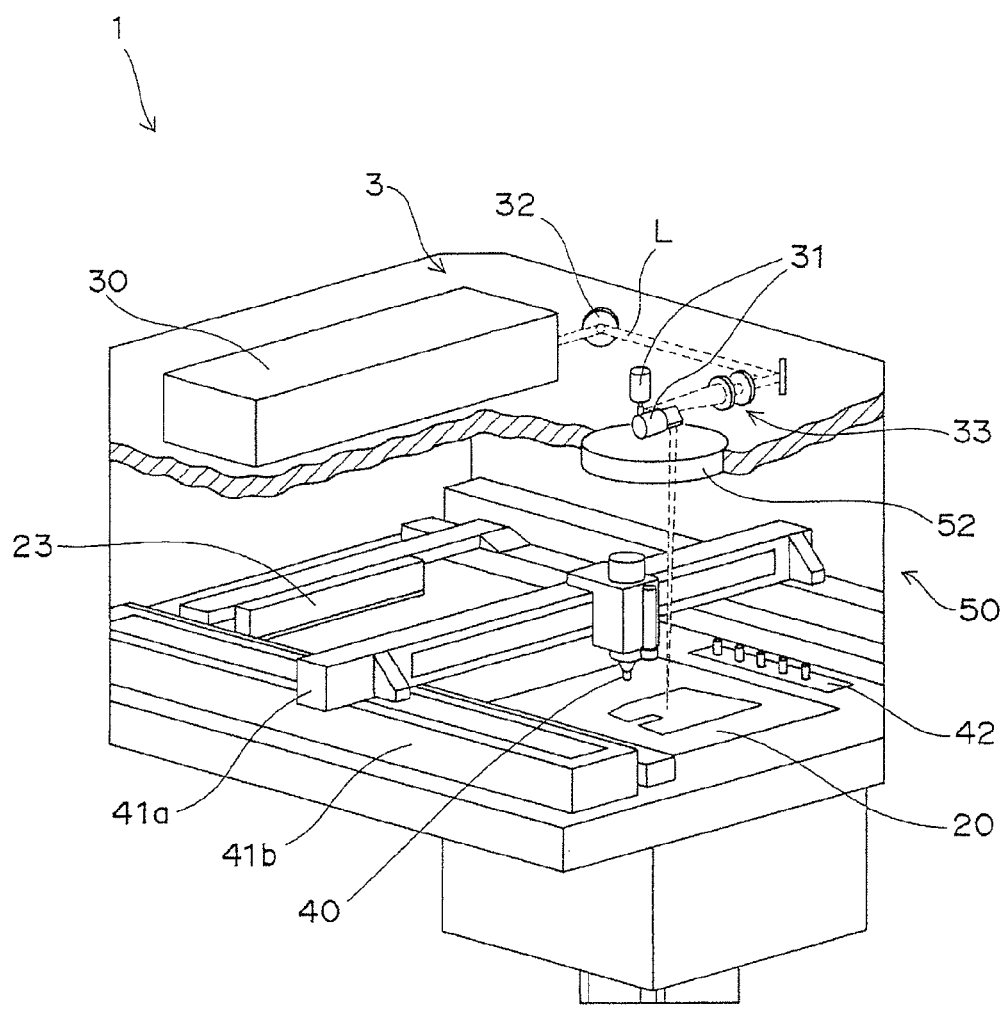
FIG. 2 is a perspective view schematically showing an embodiment in which a selective laser sintering method is carried out.
Figure 3:
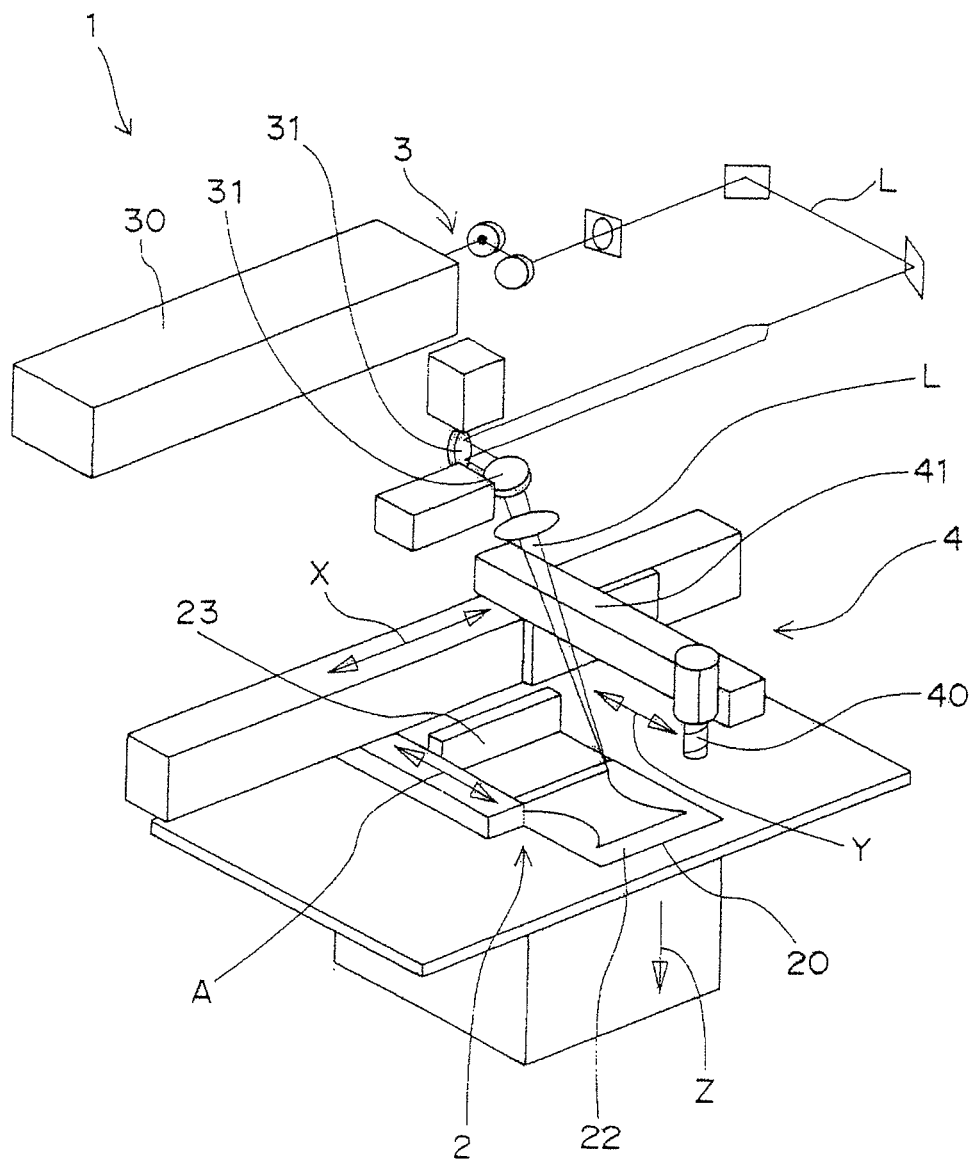
FIG. 3 is a perspective view schematically showing a constitution of a laser-sintering/machining hybrid machine by which a selective laser sintering method is carried out.

The present invention will be hereinafter described in more detail with reference to the accompanying drawings.
[Selective Laser Sintering Method]
First, a selective laser sintering method, on which the manufacturing method of the present invention is based, will be described. FIGS. 1 to 3 show functions and constitutions, which enable execution of the selective laser sintering method, of a laser-sintering/machining hybrid machine. The laser-sintering/milling hybrid machine 1 is mainly provided with a "powder layer forming means 2 for forming a powder layer by providing a powder such as a metal powder or a resin powder in a predetermined thickness"; a "forming table 20 which is capable of vertically elevating/descending by cylinder drive in a forming tank 29 whose outer periphery is surrounded with a wall 27"; a "base plate for shaped object 21 which is disposed on the forming table 20 and serves as a platform of a shaped object"; a "laser-beam irradiation means 3 for irradiating a desired position with an emitted light beam L"; and a "machining means 4 for milling the periphery of a shaped object". As shown in FIG. 1, the powder layer forming means 2 is mainly composed of a "powder table 25 capable of vertically elevating/descending by cylinder drive in a storage tank for powder material 28 whose outer periphery is surrounded with a wall 26" and a "squeegee blade 23 for forming a powder layer 22 on a base plate for shaped object or forming table". As shown in FIG. 2 and FIG. 3, the laser-beam irradiation means 3 is mainly composed of a "light beam generator 30 for emitting a light beam L" and a "galvanometer mirror 31 (scan optical system) for scanning a light beam L onto a powder layer 22". Optionally, the laser-beam irradiation means 3 is equipped with a beam shape correcting means for correcting a shape of a light beam spot (e.g., a means composed of a pair of cylindrical lens and a rotation drive mechanism for rotating the lens around a shaft line of the light beam) and fθ lens. The machining means 4 is mainly composed of a "milling head 40 for milling the periphery of a shaped object" and an "X-Y actuator 41 (41a, 41b) for driving the milling head 40 to move toward the position to be milled (see FIG. 2 and FIG. 3).

Figure 4:
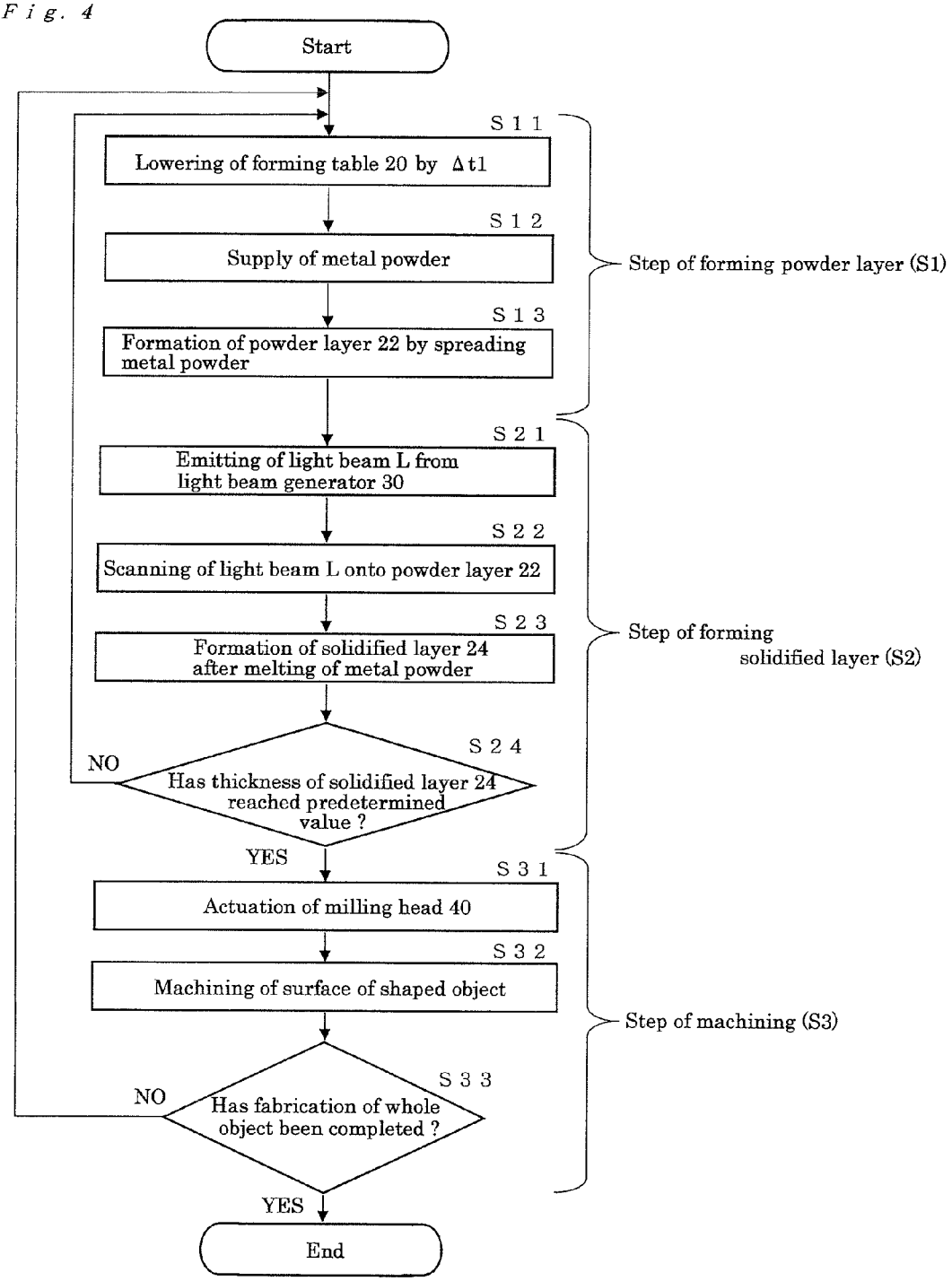
FIG. 4 is a flow chart of operations of a laser-sintering/machining hybrid machine.
Figure 5:
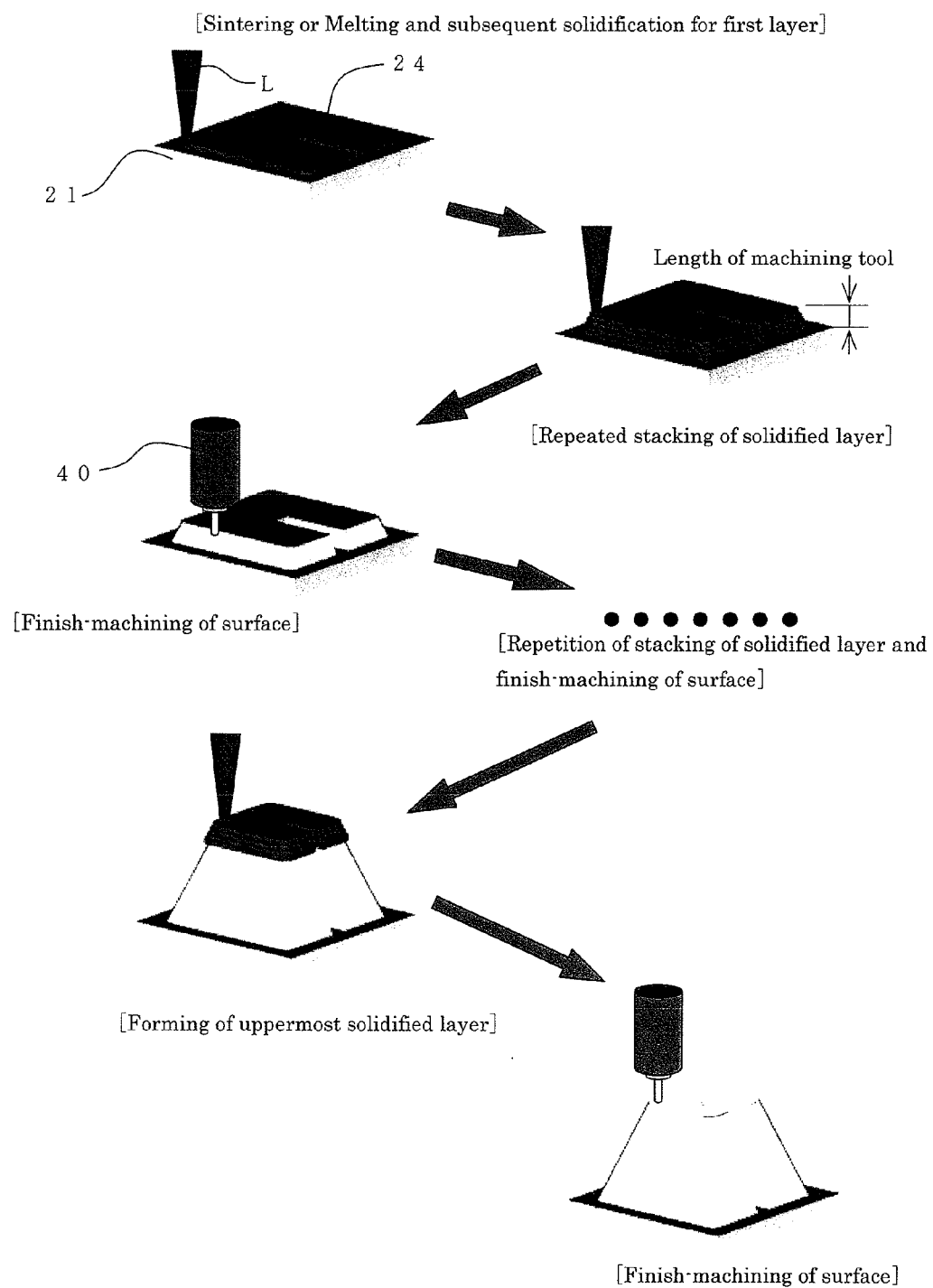
FIG. 5 is a schematic view showing a laser-sintering/machining hybrid process with a lapse of time.

Operations of the laser-sintering/machining hybrid machine 1 will be described in detail with reference to FIG. 1, FIG. 4 and FIG. 5. FIG. 4 shows a general operation flow of a laser-sintering/machining hybrid machine. FIG. 5 schematically and simply shows a laser-sintering/machining hybrid process.

The operations of the laser-sintering/machining hybrid machine are mainly composed of a powder layer forming step (S1) of forming a powder layer 22; a solidified layer forming step (S2) of irradiating the powder layer 22 with a light beam L to form a solidified layer 24; and a machining step (S3) of milling a surface of a shaped object. In the powder layer forming step (S1), first, the forming table 20 is descended by Δt1 (S11). Subsequently, a powder table 25 is elevated by Δt1, and thereafter the squeegee blade 23 is driven to move in the direction of arrow "A" as shown in FIG. 1(a). Whereby, a powder (e.g., an "iron powder having a mean particle diameter of about 5 μm to 100 μm" or a "powder having a mean particle diameter of about 30 μm to 100 μm, such as a powder of nylon, polypropylene or ABS") placed on the powder table 25 is spread to form a powder layer 22 in a predetermined thickness Δt1 (S13), while being transferred onto the base plate 21 (S12). Following this step, the solidified layer forming step (S2) is performed. In this the solidified layer forming step, a light beam L (e.g., carbon dioxide gas laser (500 W), Nd:YAG laser (500 W), fiber laser (500 W) or ultraviolet light) is emitted from the light beam generator 30 (S21) and then a light beam L is scanned onto a desired position of the powder layer 22 by means of the galvanometer mirror 31 (S22). The scanned light beam can cause the powder to be melted and solidified, resulting in a formation of the solidified layer 24 integrated with the base plate 21 (S23). There is not limitation on transmission of the light beam in air, and the light beam may also be transmitted through an optical fiber or the like.

The powder layer forming step (S1) and the solidified layer forming step (S2) are repeatedly performed until the thickness of the stacked layers 24 reaches such a predetermined value that is obtained based on a tool length of the milling head 40 (see FIG. 1(b)). Upon a sintering of the powder or a melting and subsequent solidification of the powder, the newly stacked solidified layer is integrated with the lower solidified layer which has already been formed.

When the thickness of the stacked solidified layers 24 reaches a predetermined thickness, the machining step (S3) is initiated. In the embodiments as shown in FIG. 1 and FIG. 5, the milling head 40 is actuated to initiate execution of the machining step (S31). For example, in a case where the tool (ball end mill) of the milling head 40 has a diameter of 1 mm and an effective milling length of 3 mm, a milling in a depth of 3 mm can be performed. Therefore, when Δt1 is 0.05 mm, the milling head 40 is actuated when sixty solidified layers are formed. The milling head 40 is moved in X and Y directions by means of the X-Y actuator 41 (41a, 41b) and the shaped object composed of stacked solidified layers 24 is subjected to the surface machining (S32). When the entire three-dimensional shaped object has not yet been manufactured, the step returns to the powder layer forming step (S1). Thereafter, the steps S1 through S3 are repeatedly performed to further stack the solidified layers 24, and thereby making it possible to manufacture the desired three-dimensional shaped object (see FIG. 5).

An irradiation path of the light beam L in the solidified layer forming step (S2) and a milling path in the machining step (S3) are determined in advance using 3-D CAD data. In this case, the machining path is determined by applying contour line processing. For example, in the solidified layer forming step (S2), the contour shape data of each of sliced sections, which are regularly-pitched (e.g., 0.05 mm pitch when Δt1 is 0.05 mm) sliced sections of STL data produced from a 3-D CAD model, are used.

[Manufacturing Method of the Present Invention]

With respect to the selective laser sintering method, the present invention particularly taking account of use applications of the three-dimensional shaped object. More specifically, the surface, to which a force is applied when the three-dimensional shaped object is used (namely, "surface which comes into contact with the other substance or member when the three-dimensional shaped object is in use") is subjected to a machining process.

In the following description, the present invention will be described by way of an embodiment using a "metal powder" as the powder. The "embodiment using a metal powder" corresponds to an "embodiment using a metal powder layer as a powder layer". By the way, the metal powder used in the present invention may be a powder containing an iron based powder as a main component, and may be a powder which further contains at least one kind selected from the group consisting of a nickel powder, a nickel based alloy powder, a copper powder, a copper based alloy powder and a graphite powder in some cases. Examples of the metal powder include a metal powder in which the proportion of an iron based powder having a mean particle diameter of about 20 μm is 60 to 90% by weight, the proportion of both or either of a nickel powder and a nickel based alloy powder is 5 to 35% by weight, the proportion of both or either of a copper powder and/or a copper based alloy powder is 5 to 15% by weight, and the proportion of a graphite powder is 0.2 to 0.8% by weight. It should be noted that the metal powder is not limited to such iron based powder, and may also be a copper based powder or an aluminum powder. It should be also noted that, when the three-dimensional shaped object is used for use application other than a metal mold use, a plastic powder or a ceramic powder may also be suitably used.

Figure 6:
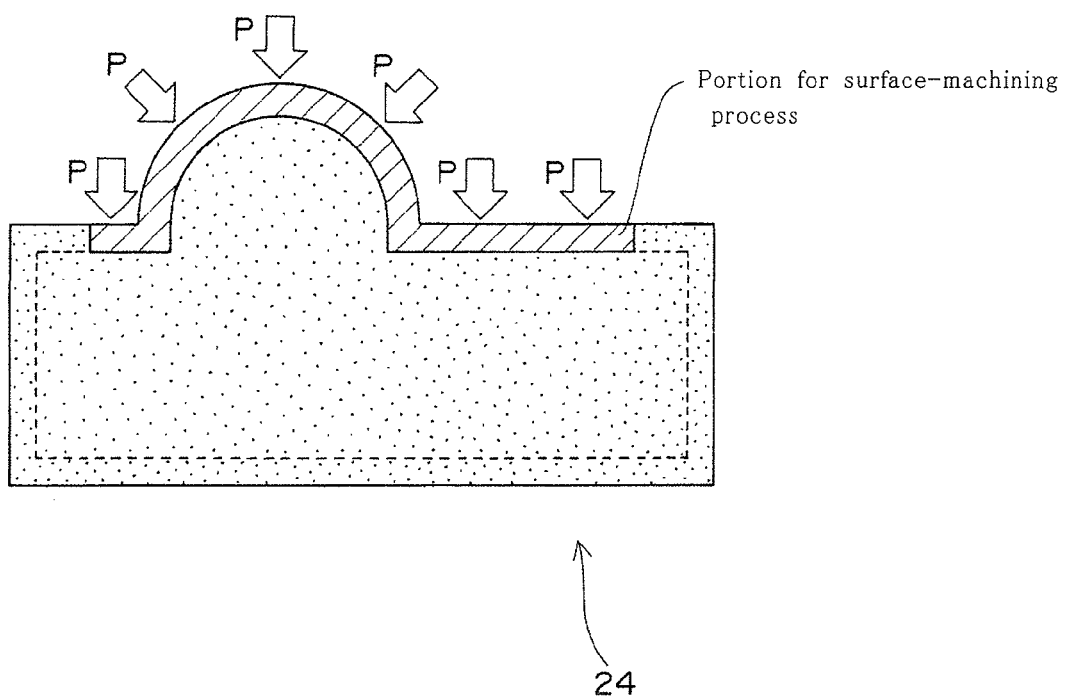
FIG. 6 is a schematic view schematically showing a feature of a three-dimensional shaped object obtained by the manufacturing method of the present invention.
Figure 7:
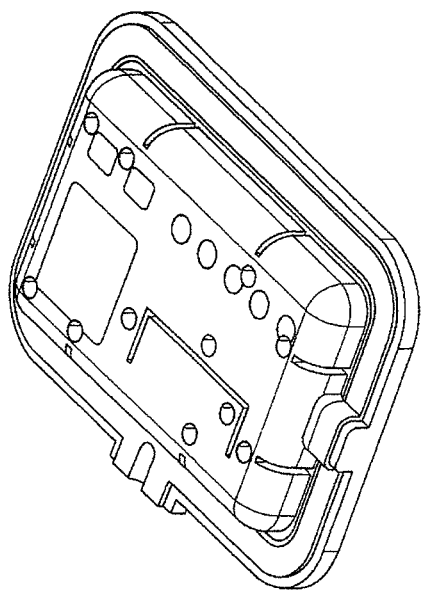
FIG. 7 is a schematic view showing an embodiment of a three-dimensional shaped object used as a core metal mold or cavity metal mold.
Figure 7:
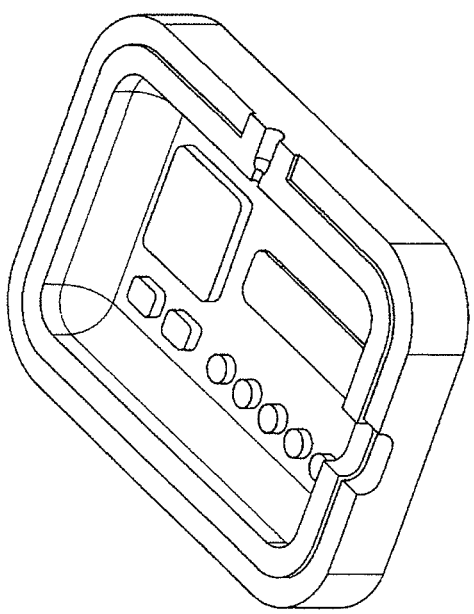
Figure 8:
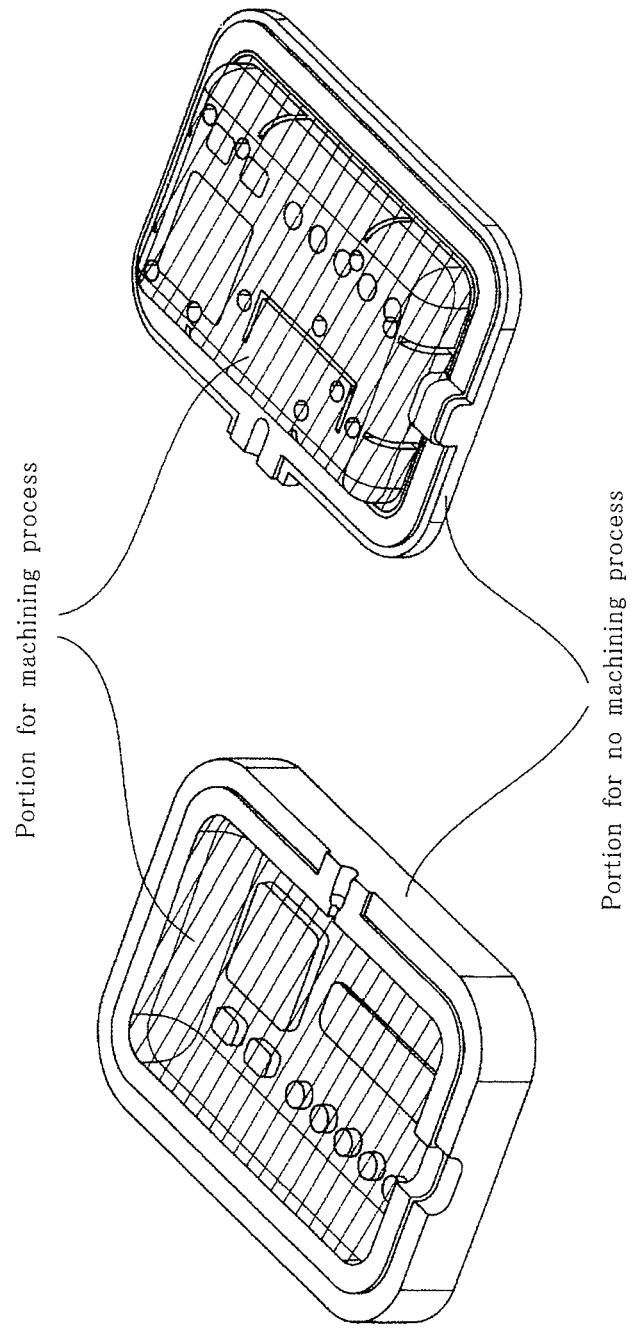
FIG. 8 is a schematic view showing an embodiment wherein only the cavity-forming surface is subjected to a machining process.

In the manufacturing method of the present invention, as shown in FIG. 6, only the portion, to which a force P is applied when the three-dimensional shaped object 24 is used, is subjected to a surface machining process. Examples of use application of the three-dimensional shaped object, for example, may include a core metal mold or a cavity metal mold as shown in FIG. 7. In the case of the metal mold, a force is applied to a "cavity-forming surface" of the three-dimensional shaped object in use. That is, since the cavity space formed by a mold-clamping of the core and cavity-side metal molds is filled with a resin material upon performing a molding process, the cavity-forming surface is then subjected to a force from the "resin material" or "molded article obtained therefrom". In this regard, the present invention subjects only such "cavity-forming surface" to a surface milling process (see FIG. 8).

A means for the machining process may be any suitable one capable of performing a surface machining treatment. For example, the means for the machining process is a numerical control (NC: Numerical Control) machine tool or those analogous thereto. Specifically, it is preferably a machining center (MC) whose milling tool (end mill) is automatically exchangeable. As the end mill, for example, a twin bladed ball end mill of a superhard material is mainly used. A square end mill, a radius end mill, a drill or the like may also be used according to an intended machined shape or a purpose of use.

The surface machining process according to the present invention can improve a surface roughness of the shaped object. For example, a surface roughness Rz of the machined portion may be preferably 10 μm or less (Rz=0 to 10 μm), more preferably 5 μm or less (Rz=0 to 5 μm), and still more preferably 0.1 μm or less (Rz=0 to 0.1 μm). The term "surface roughness Rz" used herein substantially means a roughness measure which is obtained by adding up "height up to the uppermost mountain peak" and "depth down to the valley portion" from an average line in a roughness profile (i.e., "cross-sectional profile of the solidified layer surface").

When the three-dimensional shaped object is used as the metal mold, the proportion of the area occupied by the machined surface may be approximately in the range of 30 to 50% based on the entire surface of the shaped object, depending on a type, a size or the like of a molded article. Accordingly, the above proportion can contribute to not only shortening a manufacturing time, but also reducing the extent of the damage (i.e., the extent of milling stress or milling heat) onto the three-dimensional shaped object, such damage being attributed to the machining process. For example, not only it is possible to prevent cracks attributed to the surface milling from occurring, but also it is possible for the three-dimensional shaped object to maintain a desired mechanical strength thereof (that is, it is possible to virtually maintain the strength of the shaped object at a point in time when the laser-sintering is completed).

Figure 9:
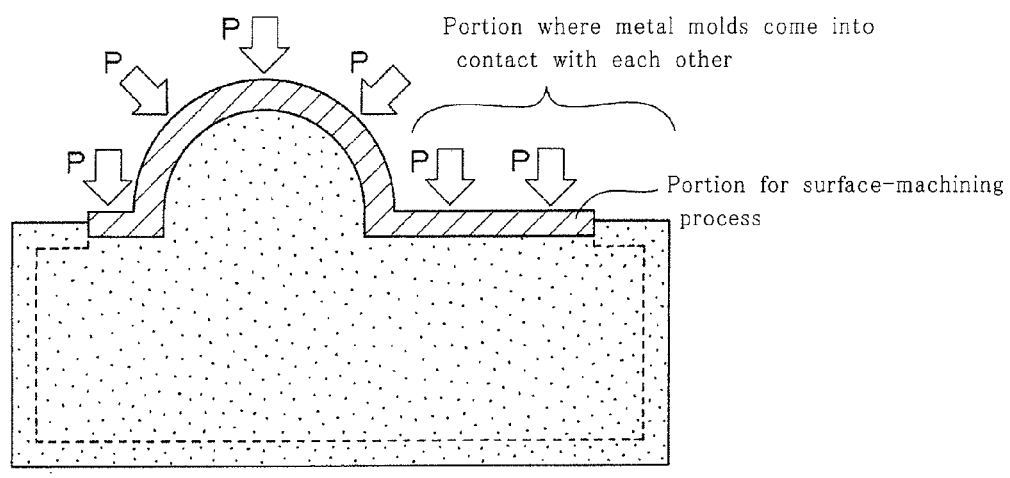
FIG. 9 is a schematic view showing an embodiment wherein only a part of a metal mold surface where a core metal mold and a cavity metal mold when being used come into contact with each other is subjected to a machining process.
Figure 10:
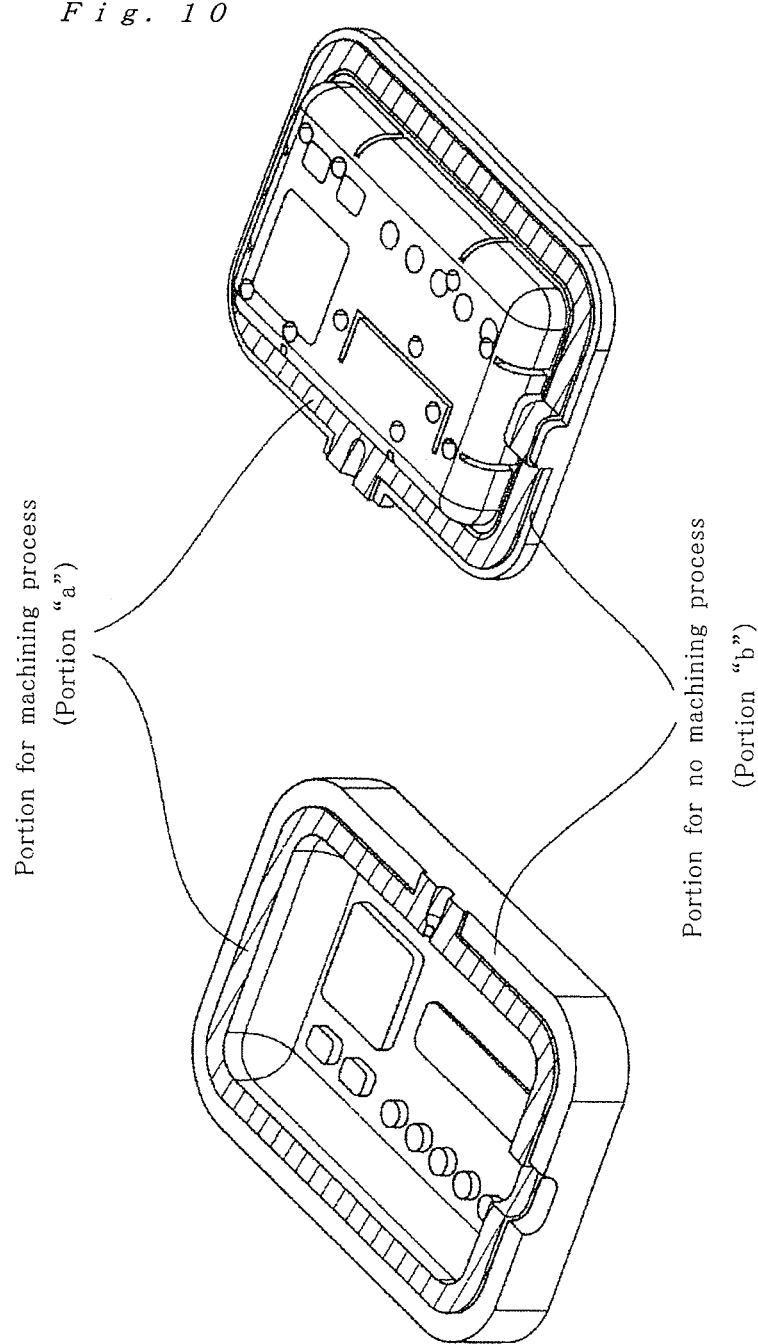
FIG. 10 is a schematic view showing an embodiment wherein only an annular surface part positioned immediately outside the cavity-forming surface is subjected to a machining process.

Examples of the embodiment wherein "only the portion to which a force is applied when the three-dimensional shaped object is used is subjected to a surface milling process" are as follows:

In a case where the three-dimensional shaped object is used as a core-side or cavity-side metal mold, the surface milling process may be performed only for the surface portion corresponding to a part of a metal mold's surface where the core metal mold and the cavity metal mold when being used come into contact with each other (see FIG. 9). In other words, a part of the mold region on which the metal molds come into contact with each other is subjected to a milling process. More specifically, the entire mold's surface on which the core metal mold and the cavity metal mold when being used come into contact with each other is not subjected to the milling process, and instead only the annular portion of the mold's surface located immediately outside the cavity-forming surface (see FIG. 10) is subjected to the milling process. In this case, the milled surface can serve as a "sealing surface" when the core-side metal mold and the cavity-side metal mold are mutually mold-clamped. As for this embodiment, it is preferred as shown in FIG. 9 or FIG. 10 that the shaped object is manufactured such that "surface portion to be not subjected to the milling process" has a lower level than "surface portion to be subjected to the milling process". In other words, the portion which is not subjected to a finish-machining of surface is preferably formed with its sintered surface exposed so that it is lowered by one stage. The reason for this is that the surface level of the "portion "a" to be subjected to the milling process" is finally lowered by the milling process. This means that, when the surface level of the "portion "b" to be not subjected to the milling process" is lowered in advance, the portion "a" and the portion "b" can be made flush with each other after the milling process is completed, which makes it possible for the portion "a" to suitably serves as a sealing surface. For example, it is preferred that the level of "portion "b" to be not subjected to the milling process" is made lower by approximately 0.3 to 1 mm than that of "portion "a" to be subjected to the milling process" in the shaped object (i.e. object obtained by the selective laser sintering method).

Figure 11:
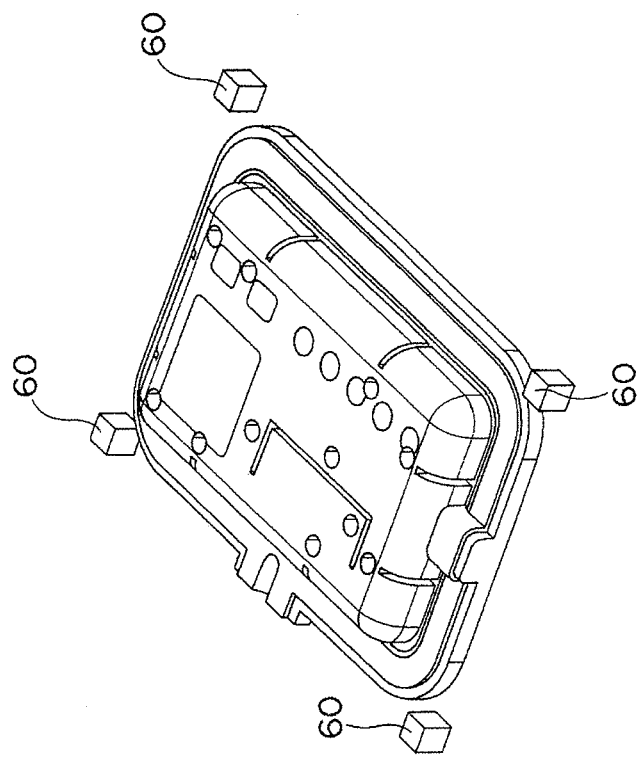
FIG. 11 is a schematic view showing an embodiment wherein a portion or surface region serving as a later-machining reference is additionally subjected to a machining process.
Figure 11:
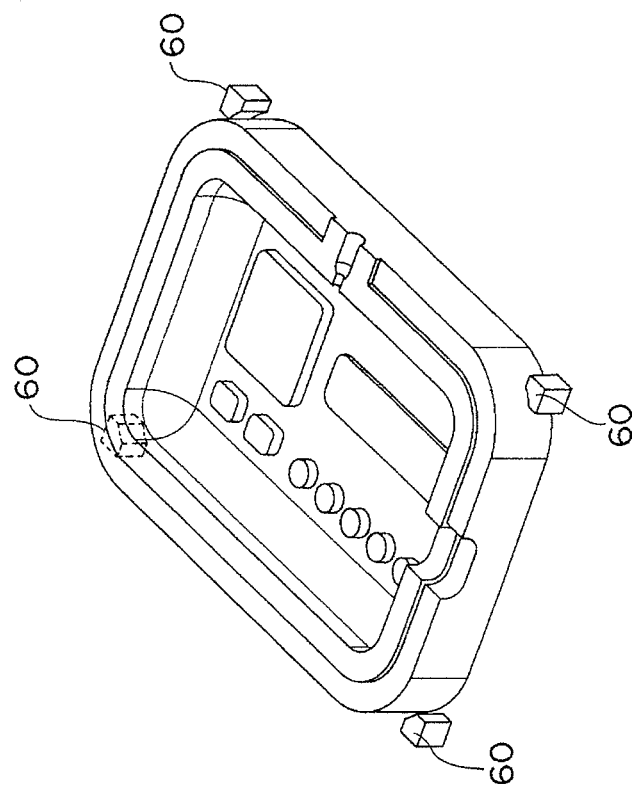
Figure 12:
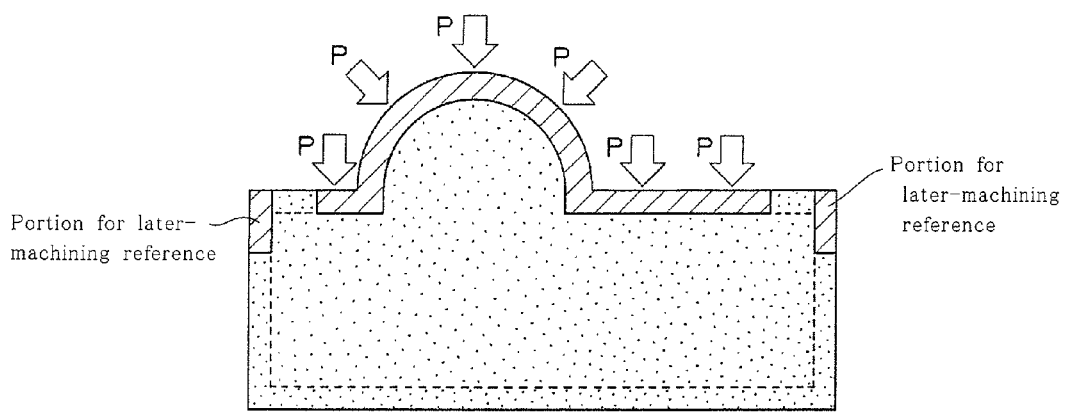
FIG. 12 is a schematic view showing an embodiment wherein a portion or surface region serving as a later-machining reference is additionally subjected to a machining process.

In the manufacturing method of the present invention, the portion/surface region which will serve as a later-machining reference 60 may be additionally subjected to the surface milling process (see FIGS. 11 and 12). As described above, the term "later-machining reference" substantially means an indication at the later time of another processing treatment. For example, considering a case where the three-dimensional shaped object or a base plate for the shaped object integrated therewith is afterward machined according to an intended end-usage, an indicating part therefor can correspond to the later-machining reference. The present invention may form the indication for the later machining in advance by the milling process. More specifically, in a case where the three-dimensional shaped object is used as the metal mold, and thus the shaped object integrated with the base plate will be mounted to a mold-clamping device, it is necessary to machine the base plate so as to make it into a suitable shape for the mounting. Therefore, a reference for machining the base plate is formed in advance on the three-dimensional shaped object. This makes it easy to perform "later-machining" after manufacturing of the three-dimensional shaped object is completed, which will lead to an achievement of desirable use of the three-dimensional shaped object.

Figure 13:
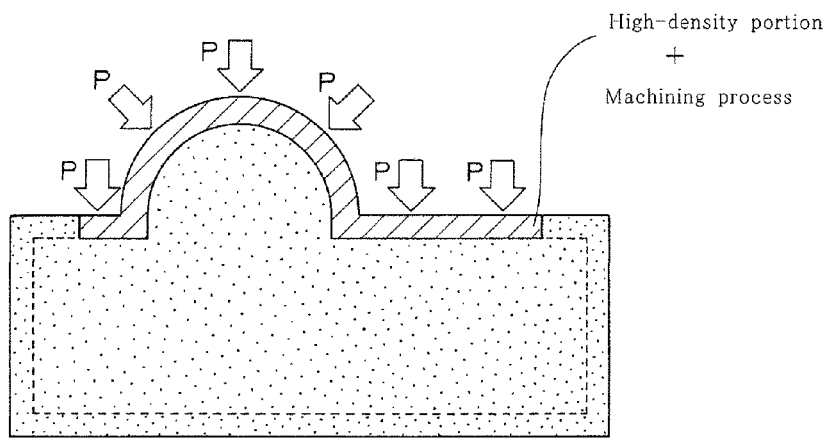
FIG. 13 is a schematic view showing an embodiment wherein a high-density portion is formed in a portion to which the force is applied when the three-dimensional shaped object is used, and such high-density portion is subjected to a machining process.
Figure 14:
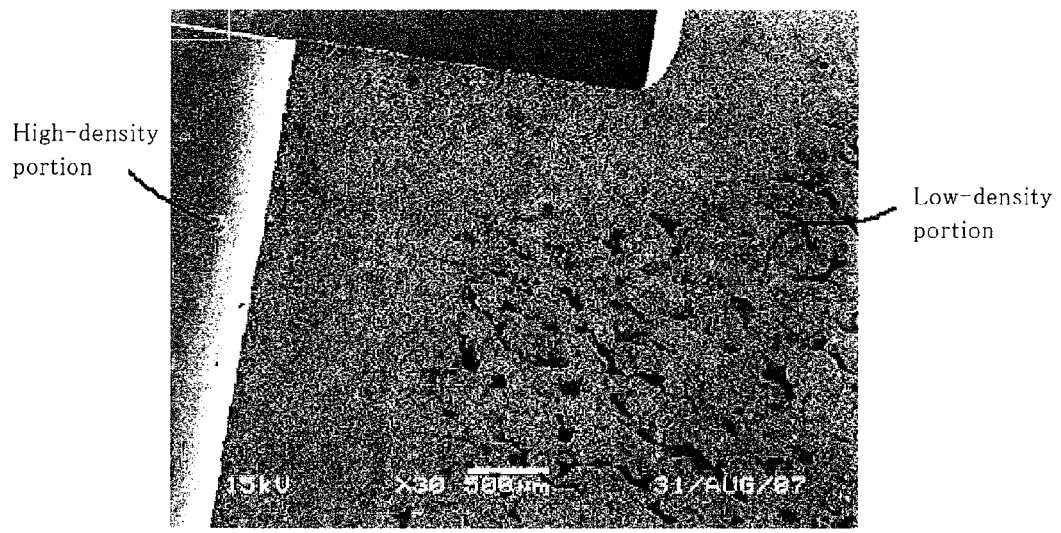
FIG. 14 is a SEM photograph of a boundary between a high-density portion and a low-density portion.
Figure 15:
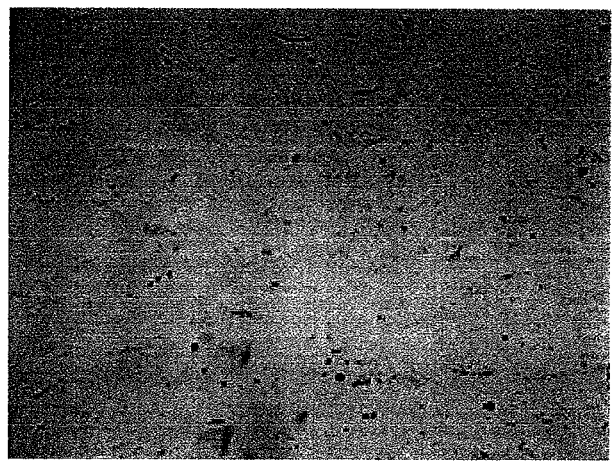
FIG. 15 is SEM photographs (sectional photograph of a three-dimensional shaped object) of a high-density portion (melting) and a low-density portion.
Figure 15:
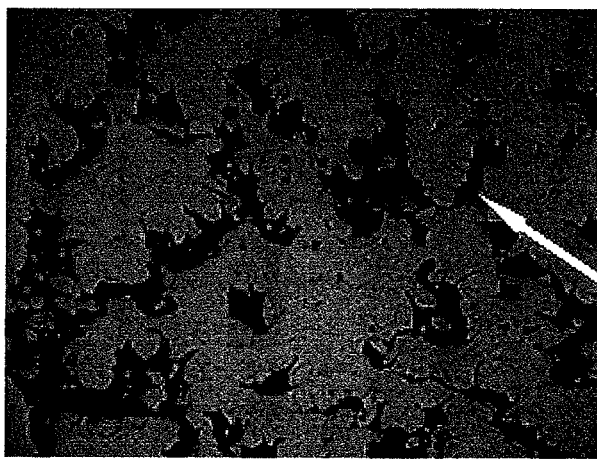
Figure 16:
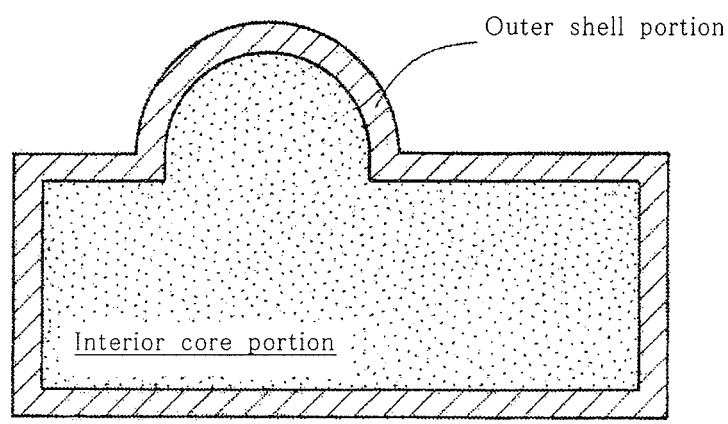
FIG. 16 is a schematic view showing an embodiment of a three-dimensional shaped object of the prior art (JP-T-8-504139).

In the manufacturing method of the present invention, as shown in FIG. 13, a high-density portion of the solidified layer may be formed only in a portion to which a force is applied when the three-dimensional shaped object is used, in which case the high-density portion may be subjected to the surface milling process. This means that the high-density portion is formed only at required position, and thereby making it possible to shorten a manufacturing time as well as reduce manufacturing cost in terms of the forming of solidified layers. It is preferred to form the high-density portion (i.e., high-density melting) due to a complete melting of the powder in the predetermined area irradiated with the light beam. For example, the solidified layers may be formed such that they have the high-density portion whose solidified density is 95 to 100% and a low-density portion whose solidified density is 0 to 95% (excluding 95%) In FIG. 14, a SEM photograph of the boundary portion between the high-density portion and the low-density portion is shown. In FIG. 15, the respective cross-sectional photographs (SEM photographs) of the high-density portion and the low-density portion are shown.

As used in this description and claims, the term "solidified density" substantially means a sintered sectional density (occupation ratio of a metallic material) determined by image processing of a sectional photograph of the shaped object. Image processing software for determining the sintered sectional density is Scion Image ver. 4.0.2 (freeware). In such case, it is possible to determine a sintered sectional density $\rho_S$ from the below-mentioned equation 1 by binarizing a sectional image into a sintered portion (white) and a vacancy portion (black), and then counting all picture element numbers $Px_{all}$ of the image and picture element number $Px_{white}$ of the sintered portion (white).

$$\rho_S = \frac{Px_{white}}{Px_{all}} \times 100(\%) \quad \text{[Equation 1]}$$

In order to form the high-density portion, the complete melting of the powder may be allowed to occur by increasing an output energy of the light beam for irradiation. While on the other hand, in order to form the low-density portion, the complete melting of the powder may not be allowed to occur by decreasing the output energy of the light beam for irradiation. In addition to (a) increasing of output energy of the light beam, it is also possible to form the high-density portion by (b) lowering a scanning rate of the light beam, (c) narrowing scanning pitch of the light beam, and (d) decreasing a condensing diameter of the light beam. The aforementioned operations (a) to (d) may be performed alone, or performed in combination. Especially with respect to the aforementioned operation (a) for example, the high-density portion whose solidified density is 95 to 100% can be formed by adjusting an irradiation energy density E of the light beam in a range from about 4 to 15 J/mm². Similarly, it is also possible to form the low-density portion by (a) decreasing of the output energy of the light beam, (b) increasing a scanning rate of the light beam, (c) enlarging a scanning pitch of the light beam and (d) increasing a condensing diameter of the light beam. For example, the low-density portion whose solidified density is 70 to 90% can be formed by adjusting the irradiation energy density E of the light beam in a range from about 1 to 3 J/mm². It should be noted that Energy density E=Laser output power (W)/(Scanning rate (mm/s)×Scanning pitch (mm)) wherein the manufacturing condition is as follows: Powder layer thickness: 0.05 mm, Laser; $CO_2$ Laser(Carbon dioxide laser), Spot diameter: 0.5 mm).

Although a few embodiments of the present invention have been hereinbefore described, the present invention is not limited to these embodiments. It will be readily appreciated by those skilled in the art that various modifications are possible without departing from the scope of the present invention.

It should be noted that the present invention as described above includes the following aspects:

The first aspect: A method for manufacturing a three-dimensional shaped object, the method comprising the repeated steps of:

(i) forming a solidified layer by irradiating a predetermined portion of a powder layer with a light beam, thereby allowing a sintering of the powder in the predetermined portion or a melting and subsequent solidification thereof; and (ii) forming another solidified layer by newly forming a powder layer on the resulting solidified layer, followed by the irradiation of a predetermined portion of the powder layer with the light beam;

wherein only the surface portion of the solidified layer, to which a force is applied when the three-dimensional shaped object is used, is subjected to a machining process.

The second aspect: The method according to the first aspect, wherein the three-dimensional shaped object is used as a core metal mold or cavity metal mold; and only the surface portion corresponding to a cavity-forming surface of the metal mold when being used is subjected to the machining process.

The third aspect: The method according to the first or second aspect, wherein the three-dimensional shaped object is used as a core metal mold or cavity metal mold; and only the surface portion corresponding to apart of a metal mold's surface where the core metal mold and the cavity metal mold when being used come into contact with each other is subjected to the machining process.

The fourth aspect: The method according to the third aspect, wherein the solidified layer is formed such that "portion to be not subjected to the machining process" has a surface level lower than "portion to be subjected to the machining process".

The fifth aspect: The method according to any one of the first to fourth aspects, wherein a portion of the solidified layer, which serves as a later-machining reference, is additionally subjected to the machining process.

The sixth aspect: The method according to any one of the first to fifth aspects, wherein the solidified layer is formed such that the surface portion of the solidified layer, to which the force is applied when the three-dimensional shaped object is used, has a high-density with its solidified density of 95 to 100%.

The seventh aspect: A three-dimensional shaped object obtained by the method according to the second aspect, used as a core metal mold or cavity metal mold; and the three-dimensional shaped object has a machined surface serving as a cavity-forming surface of the metal mold.

The eighth aspect: A three-dimensional shaped object obtained by the method according to the third aspect, used as a core metal mold or cavity metal mold; and the three-dimensional shaped object has a machined surface serving as a part of a metal mold's surface where the core metal mold and the cavity metal mold when being used come into contact with each other.

INDUSTRIAL APPLICABILITY

The method for manufacturing a three-dimensional shaped object according to present invention can produce various kinds of objects. For example in a case where the powder layer is a metal powder layer (inorganic powder layer) and thus the solidified layer corresponds to a sintered layer, the produced three-dimensional shaped object can be used as a metal mold for a plastic injection molding, a press molding, a die casting, a casting or a forging. While on the other hand in a case where powder layer is a resin powder layer (organic powder layer) and thus the solidified layer corresponds to a cured layer, the produced three-dimensional shaped object can be used as a resin molded article.

CROSS REFERENCE TO RELATED PATENT APPLICATION

The present application claims the right of priority of Japanese Patent Application No. 2009-148866 (filed on Jun. 23, 2009, the title of the invention: "METHOD FOR MANUFACTURING THREE-DIMENSIONAL SHAPED OBJECT AND THREE-DIMENSIONAL SHAPED OBJECT OBTAINED BY THE SAME"), the disclosure of which is incorporated herein by reference.

The invention claimed is:

1. A method for manufacturing a three-dimensional shaped object, the method comprising:

forming a solidified layer by irradiating a predetermined portion of a powder layer with a light beam, thereby allowing a sintering of the powder in the predetermined portion or a melting and subsequent solidification thereof; and forming another solidified layer by newly forming a powder layer on the resulting solidified layer, followed by the irradiation of a predetermined portion of the powder layer with the light beam, wherein the solidified layer and the another solidified layer together define an integrated solidified layer, wherein an annular portion of a surface region of the integrated solidified layer is positioned immediately outside of a cavity forming surface of the three-dimensional shaped object and formed such that a predetermined portion not to be subjected to a machining process has a surface level lower than a predetermined portion to be subjected to the machining process prior to machining, thereby providing a stepped portion at the annular portion of the surface region, wherein the stepped portion is removed by machining the predetermined portion to be subjected to the machining process, thereby resulting in a planar surface defined by both the predetermined portion not to be subjected to the machining process and the predetermined portion that is machined, wherein the three-dimensional shaped object and the cavity forming surface thereof is configured to be used as at least one of a core metal mold and a cavity metal mold, and wherein the planar surface defines a part of a surface of a metal mold where the core metal mold and the cavity metal mold are configured to come into contact with each other when being used together in the molding process.

2. The method according to claim 1, wherein a portion of the integrated solidified layer, which serves as an indication used at a later time of another processing, is additionally subjected to the machining process.

3. The method according to claim 1, wherein at least a portion of the planar surface, to which a force is to be applied when the three-dimensional shaped object is used in the molding process, has a high-density with its solidified density of 95 to 100%.

4. The method according to claim 1, wherein the integrated solidified layer is formed such that the portion not to be subjected to the machining process has a surface level that is in a range of 0.3 mm to 1.0 mm lower than the portion to be subjected to the machining process.

* * * * *